(12) United States Patent
Unno et al.

(10) Patent No.: US 9,086,105 B2
(45) Date of Patent: Jul. 21, 2015

(54) FRICTION MATERIAL COMPOSITION, FRICTION MATERIAL USING THE SAME, AND FRICTION MEMBER

(71) Applicant: HITACHI CHEMICAL COMPANY, LTD., Tokyo (JP)

(72) Inventors: Mitsuo Unno, Hitachi (JP); Manabu Ono, Hitachinaka (JP); Takashi Kikudome, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 14/255,416

(22) Filed: Apr. 17, 2014

(65) Prior Publication Data

US 2014/0227541 A1 Aug. 14, 2014

Related U.S. Application Data

(62) Division of application No. 13/322,587, filed as application No. PCT/JP2009/063946 on Aug. 6, 2009.

(30) Foreign Application Priority Data

| Jun. 1, 2009 | (JP) | 2009-131993 |
| Jun. 1, 2009 | (JP) | 2009-131996 |
| Jun. 1, 2009 | (JP) | 2009-131999 |

(51) Int. Cl.

| *F16D 69/02* | (2006.01) |
| *C09K 3/14* | (2006.01) |
| *C08J 5/14* | (2006.01) |
| *B29C 70/78* | (2006.01) |
| *C08L 61/04* | (2006.01) |
| *F16D 69/00* | (2006.01) |
| *B29K 401/00* | (2006.01) |
| *B29K 427/18* | (2006.01) |
| *B29K 505/08* | (2006.01) |
| *B29K 505/12* | (2006.01) |
| *B29K 509/02* | (2006.01) |
| *B29K 511/00* | (2006.01) |
| *B29K 705/00* | (2006.01) |
| *B29L 31/16* | (2006.01) |

(52) U.S. Cl.
CPC .............. *F16D 69/026* (2013.01); *B29C 70/78* (2013.01); *C08L 61/04* (2013.01); *F16D 69/028* (2013.01); *B29K 2401/00* (2013.01); *B29K 2427/18* (2013.01); *B29K 2505/08* (2013.01); *B29K 2505/12* (2013.01); *B29K 2509/02* (2013.01); *B29K 2511/00* (2013.01); *B29K 2705/00* (2013.01); *B29K 2995/0016* (2013.01); *B29L 2031/16* (2013.01); *F16D 2069/002* (2013.01); *F16D 2200/0069* (2013.01); *F16D 2200/0086* (2013.01); *Y10T 428/12035* (2015.01); *Y10T 428/12951* (2015.01)

(58) Field of Classification Search
CPC .......... C09K 3/14; C09K 3/149; F16D 69/02; F16D 69/025; F16D 69/026; F16D 69/027; F16D 69/028
USPC .............................. 106/36; 523/149, 152, 153
See application file for complete search history.

(56) References Cited

U.S. PATENT DOCUMENTS

| 4,119,591 | A | * | 10/1978 | Aldrich ........................ 523/156 |
| 4,374,211 | A | * | 2/1983 | Gallagher et al. ............ 523/156 |
| 4,743,635 | A | | 5/1988 | Nakagawa et al. |
| 5,576,358 | A | | 11/1996 | Lem et al. |
| 5,891,933 | A | | 4/1999 | Kesavan et al. |
| 6,167,992 | B1 | | 1/2001 | Torpey et al. |
| 6,220,405 | B1 | | 4/2001 | Kesavan et al. |
| 6,228,815 | B1 | | 5/2001 | Kesavan |
| 6,372,817 | B1 | | 4/2002 | Kinouchi et al. |

(Continued)

FOREIGN PATENT DOCUMENTS

| CN | 1048047 A | 12/1990 |
| CN | 1312196 | 9/2001 |
| EP | 1 443 237 | 8/2004 |
| EP | 1 482 203 | 12/2004 |
| EP | 1 609 837 | 12/2005 |

(Continued)

OTHER PUBLICATIONS

Japanese Office Action issued on Sep. 3, 2013, in corresponding Japanese Patent Application No. 2011-518197.

(Continued)

*Primary Examiner* — Anthony J Green

(57) ABSTRACT

Provided is a friction material composition comprising: a binder; a fibrous base material; an abrasive material; an inorganic filler; and an organic filler,
wherein the friction material composition further comprises:
at least one selected from the group consisting of zinc, a cellulose fiber as the fibrous base materials and a flame retardant fiber as the fibrous base materials;
an iron-based fiber as the fibrous base material in an specified amount; and
an inorganic abrasive material having a Mohs hardness of 8 or higher and a particle size of 1 μm or larger as the abrasive material in an amount of 1 wt % or less. The present invention can provide a friction material composition which is less destructive to facing materials compared to conventional products, which has a high friction coefficient upon braking when used in repeated braking during high-speed traveling, and which is capable of suppressing pad wear and uneven pad wear, in the case that the friction material composition is formed into a brake pad for passenger cars. The present invention can also provide a friction material and a friction member using this friction material composition.

15 Claims, No Drawings

(56) References Cited

U.S. PATENT DOCUMENTS

| | | | |
|---|---|---|---|
| 6,612,415 B2* | 9/2003 | Yamane | 192/107 M |
| 6,656,240 B2 | 12/2003 | Chiba | |
| 2004/0030000 A1* | 2/2004 | Takeuchi et al. | 523/155 |
| 2004/0089512 A1 | 5/2004 | Marchisseau et al. | |
| 2004/0146702 A1 | 7/2004 | Shao et al. | |
| 2004/0241429 A1 | 12/2004 | Suzuki et al. | |
| 2006/0151268 A1 | 7/2006 | Kesavan et al. | |
| 2006/0162259 A1* | 7/2006 | Ono et al. | 51/298 |
| 2007/0082975 A1 | 4/2007 | Kobayashi et al. | |
| 2007/0219289 A1 | 9/2007 | Phipps et al. | |
| 2008/0121474 A1 | 5/2008 | Chugh | |
| 2009/0011962 A1* | 1/2009 | Chinda et al. | 508/167 |

FOREIGN PATENT DOCUMENTS

| | | |
|---|---|---|
| JP | 2-26923 | 1/1990 |
| JP | 7-109362 | 4/1995 |
| JP | 2000-319635 | 11/2000 |
| JP | 2002-155267 | 5/2002 |
| JP | 2004-231965 | 8/2004 |
| JP | 2006-206785 | 8/2006 |
| JP | 2007-254564 | 10/2007 |
| KR | 2005-0095891 | 10/2005 |
| WO | WO 2004/069954 A1 | 8/2004 |

OTHER PUBLICATIONS

Chinese Official Action dated Apr. 3, 2013, for CN Application No. 200980159627.9.

Translation of the International Preliminary Report on Patentability dated Dec. 22, 2011, for International Application No. PCT/JP2009/063946, filed Aug. 6, 2009.

Korean Official Action dated Aug. 29, 2013, for KR Application No. 10-2011-7027201.

Communication issued Feb. 17, 2014, by the State Intellectual Property Office of the People's Republic of China in connection with corresponding Chinese Application No. 200980159627.9.

Decision of Rejection issued by the Japan Patent Office on Jun. 24, 2014, in counterpart Japanese application No. 2011-518197.

Extended European Search Report issued by the European Patent Office on Jun. 24, 2014, in the counterpart European application No. 09845547.

* cited by examiner

FRICTION MATERIAL COMPOSITION, FRICTION MATERIAL USING THE SAME, AND FRICTION MEMBER

CROSS-REFERENCE TO RELATED APPLICATIONS

This application is a Divisional application of U.S. application Ser. No. 13/322,587, having a filing date of Nov. 28, 2011, which is a National Stage of Entry of PCT/JP2009/063946, having an international filing date of Aug. 6, 2009, which claims priority from Japanese patent application serial Nos. 2009-131993, filed Jun. 1, 2009, 2009-131996, filed Jun. 1, 2009, and 2009-131999, filed Jun. 1, 2009. The entire content of U.S. application Ser. No. 13/322,587 and PCT/JP2009/063946 are hereby incorporated by reference.

TECHNICAL FIELD

The present invention relates to a friction material composition appropriate for a friction material for a disc brake pad, brake lining and the like used in the braking of automobiles and the like, and a friction material using the friction material composition.

BACKGROUND ART

Friction materials such as disc brake pads, brake lining or the like are used for the purpose of braking of the automobiles and the like. Such a friction material plays the role of braking by being rubbed against an opposite material, for example, a disc rotor or a brake drum, for braking. Therefore, the friction materials are not only required to have a high friction coefficient and stability in the friction coefficient, but also required to have characterristics that the friction material does not easily shave a disc rotor which is a facing material (rotor wear), brake squeal does not easily occur (brake squeal characteristics), and the pad service life is long (pad service life).

Furthermore, in recent years, friction materials are required to have a less decrease in the friction coefficient (fast fading characteristics), even under severe braking conditions such that the braking temperature abnormally rises due to continuous high speed braking (a vehicle speed of 200 km/h or higher) or high deceleration braking (0.8 G or higher).

However, friction materials include a Low Steel material (hereinafter, also referred to as "LS material") which contains steel fiber as a fibrous base material and hard abrasive particles as an abrasive material, and a Non-Asbest Organic material (hereinafter, also referred to as "NAO material") which does not contain steel fiber and contains almost no hard abrasive particles.

The former has excellent fast fading characteristics but has inferior rotor wear and inferior brake squeal characteristics. The latter has excellent rotor wear and excellent brake squeal characteristics, but has inferior fast fading characteristics. Furthermore, NAO materials cause large pad wear amounts during fast fading and frequently cause uneven wear of the pad as compared with the LS materials.

Heretofore, attempts have been made to improve in the fading characteristics of NAO materials, and for example, it has been reported to achieve an improvement by using a large amount of vulcanized rubber powder instead of cashew dust and by increasing the thermal conductivity (see, for example, Patent Document 1), while it has been reported to achieve an improvement through the addition of activated alumina and a fluoropolymer (see, for example, Patent Document 2). However, the effect of improving the fading characteristics in the high-speed range (a vehicle speed of 200 km/h or higher) as described above, is not sufficient as compared with the characteristics of the LS materials.

PRIOR ART LITERATURES

Patent Literatures

Patent Literature 1: Japanese Patent Application Laid-Open (JP-A) No. 2007-254564
Patent Literature 2: WO 2004/069954

DISCLOSURE OF THE INVENTION

Technical Problem

As described above, there are many examples of making attempts to improve the fast fading characteristics of NAO materials. However, there is no instance of suggesting a friction material which achieves a good balance between the satisfactory fast fading characteristics in the high-speed range such as a vehicle speed of 200 km/h or higher, as possessed by the LS materials, and the low rotor wear of the NAO materials, and currently there is a demand for a further improved friction material.

On the other hand, the fast fading characteristics and rotor wear of the LS materials are related to the amount of steel fiber and the amount of hard abrasive particles. When the amounts of these materials are small, the fast fading characteristics are deteriorated, and when the amounts of these materials are large, rotor wear is deteriorated (increased). Accordingly, it is very difficult to making an improvement by achieving a balance between fast fading characteristics and rotor wear by using the composition of the LS materials.

In the present invention, it is an object to obtain a friction material composition which achieves a good balance between the advantages of LS materials and the advantages of NAO materials, such that the friction material composition gives a friction material exhibiting a friction coefficient of a level equivalent to that of LS materials even under the fast fading conditions associated with an abnormal increased brake temperature due to repeated crash stops at a deceleration of 0.8 G from a vehicle speed of 200 km/h, and having a less pad wear amount and uneven wear during fast fading, and also exhibits less rotor wear.

Solution to Problem

In order to achieve the object described above, the inventors of the present invention conducted a thorough investigation on the relationship amoung various combination of friction material-composition, fast fading characteristics and rotor wear, and finally came to solve the problem.

Specifically, the inventors found that when at least any one of zinc, a cellulose fiber as a fibrous base material and a flame retardant fiber as a fibrous base material, and an iron-based fiber as a fibrous base material are comprised in specific amounts into a friction material composition, and the amount of a particular inorganic abrasive material as an abrasive material is adjusted to a certain level or less, there may be obtained a friction material composition which achieves a good balance between the advantages of LS materials and the advantages of NAO materials such that the friction material composition exhibiting a friction coefficient of a level equivalent to that of LS materials even under the fast fading conditions associated with an abnormal increased brake temperature due to repeated crash stops at a deceleration of 0.8 G from a vehicle speed of 200 km/h, and having a less pad wear amount and uneven wear during fast fading, and also exhibiting less rotor wear; a friction material; and a friction member.

That is, the present invention relates to the following.

(1) A friction material composition comprising: a binder; a fibrous base material; an abrasive material; an inorganic filler; and an organic filler,
wherein the friction material composition further comprises: zinc; an iron-base fiber as the fibrous base material in an amount of 2 to 10 wt %; and an inorganic abrasive material having a Mohs hardness of 8 or higher and a particle diameter of 1 μm or larger as the abrasive material in an amount of 1 wt % or less.

(2) The friction material composition as set forth in the item (1), wherein the amount of the zinc is within the range of 2 to 5 wt %.

(3) The friction material composition as set forth in the item (1) or (2), comprising an aramid fiber as the fibrous base material in an amount of 1.5 wt % or more.

(4) The friction material composition as set forth in any one of the items (1) to (3), comprising a flame retardant fiber as the fibrous base material.

(5) The friction material composition as set forth in the item (4), comprising the flame retardant fiber in an amount of 1 to 10 wt %.

(6) The friction material composition as set forth in any one of the items (1) to (5), comprising a cellulose fiber as the fibrous base material.

(7) The friction material composition as set forth in the item (6), comprising the cellulose fiber in an amount of 1 to 10 wt %.

(8) The friction material composition as set forth in any one of the items (1) to (7), comprising cashew dust as the organic filler in an amount of 1 to 10 wt %, wherein the cashew dust is coated with a liquid rubber in an amount of 3 to 17 wt % relative to the amount of the cashew dust.

(9) The friction material composition as set forth in any one of the items (1) to (8), comprising activated alumina as the abrasive material, and comprising a fluoropolymer as the organic filler.

(10) The friction material composition as set forth in the item (9), wherein the activated alumina is an activated alumina having a specific surface area calculated by a BET method of 150 $m^2/g$ or larger.

(11) The friction material composition as set forth in the item (9) or (10), wherein the activated alumina is γ-alumina.

(12) The friction material composition as set forth in any one of the items (9) to (11), wherein the amount of the activated alumina is within the range of 1 to 10 wt % relative to the amount of the friction material composition.

(13) The friction material composition as set forth in any one of the items (9) to (12), wherein the fluoropolymer is powder of polytetrafluoroethylene.

(14) The friction material composition as set forth in any one of the items (9) to (13), wherein the amount of the fluoropolymer is within the range of 0.3 to 6 wt % relative to the amount of the friction material composition.

(15) A friction material composition comprising: a binder; fibrous base materials; an abrasive material; an inorganic filler; and an organic filler;
wherein the friction material composition comprises: a cellulose fiber as the fibrous base materials; an iron-based fiber as the fibrous base materials in an amount of 2 to 10 wt %; an inorganic abrasive material having a Mohs hardness of 8 or higher and a particle diameter of 1 μm or larger as the abrasive material in an amount of 1 wt % or less.

(16) The friction material composition as set forth in the item (15), comprising the cellulose fiber in an amount of 1 to 10 wt %.

(17) The friction material composition as set forth in the item (15) or (16), comprising an aramid fiber as the fibrous base material in an amount of 1.5 wt % or more.

(18) The friction material composition as set forth in any one of the items (15) to (17), further comprising zinc.

(19) The friction material composition as set forth in the item (18), wherein the amount of the zinc is within the range of 2 to 5 wt %.

(20) The friction material composition as set forth in any one of the items (15) to (19), comprising a flame retardant fiber as the fibrous base material.

(21) The friction material composition as set forth in the item (20), comprising the flame retardant fiber in an amount of 1 to 10 wt %.

(22) The friction material composition as set forth in any one of the items (15) to (21), comprising cashew dust as the organic filler in an amount of 1 to 10 wt %, wherein the cashew dust is coated with a liquid rubber in an amount of 3 to 17 wt % relative to the amount of the cashew dust.

(23) The friction material composition as set forth in any one of the items (15) to (22), comprising activated alumina as the abrasive material, and comprising a fluoropolymer as the organic filler.

(24) The friction material composition as set forth in the item (23), wherein the activated alumina is an activated alumina having a specific surface area calculated by a BET method of 150 $m^2/g$ or larger.

(25) The friction material composition as set forth in the items (23) or (24), wherein the activated alumina is γ-alumina.

(26) The friction material composition as set forth in any one of the items (23) to (25), wherein the amount of the activated alumina is within the range of 1 to 10 wt % relative to the amount of the friction material composition.

(27) The friction material composition as set forth in any one of the items (23) to (26), wherein the fluoropolymer is powder of polytetrafluoroethylene.

(28) The friction material composition as set forth in any one of the items (23) to (27), wherein the amount of the fluoropolymer is within the range of 0.3 to 6 wt % relative to the amount of the friction material composition.

(29) A friction material composition comprising: a binder; fibrous base materials; an abrasive material; an inorganic filler; and an organic filler,
wherein the friction material composition comprises: a flame retardant fiber as the fibrous base materials; an iron-based fiber as the fibrous base materials in an amount of 2 to 10 wt %, and an inorganic abrasive material having a Mohs hardness of 8 or higher and a particle diameter of 1 μm or larger as the abrasive material in an amount of 1 wt % or less.

(30) The friction material composition as set forth in the item (29), comprising the flame retardant fiber in an amount of 1 to 10 wt %.

(31) The friction material composition as set forth in the item (29) or (30), comprising an aramid fiber as the fibrous base material in an amount of 1.5 wt % or more.

(32) The friction material composition as set forth in any one of the items (29) to (31), further comprising zinc.

(33) The friction material composition as set forth in the item (32), wherein the amount of the zinc is within the range of 2 to 5 wt %.

(34) The friction material composition as set forth in any one of the items (29) to (33), comprising a cellulose fiber as the fibrous base material.

(35) The friction material composition as set forth in the item (34), comprising the cellulose fiber in an amount of 1 to 10 wt %.

(36) The friction material composition as set forth in any one of the items (29) to (35), comprising cashew dust as the organic filler in an amount of 1 to 10 wt %, wherein the cashew dust is coated with a liquid rubber in an amount of 3 to 17 wt % relative to the amount of the cashew dust.

(37) The friction material composition as set forth in any one of the items (29) to (36), comprising activated alumina as the abrasive material, and comprising a fluoropolymer as the organic filler.

(38) The friction material composition as set forth in the item (37), wherein the activated alumina is an activated alumina having a specific surface area calculated by a BET method of 150 m²/g or larger.

(39) The friction material composition as set forth in the item (37) or (38), wherein the activated alumina is γ-alumina.

(40) The friction material composition as set forth in any one of the items (37) to (39), wherein the amount of the activated alumina is within the range of 1 to 10 wt % relative to the amount of the friction material composition.

(41) The friction material composition as set forth in any one of the items (37) to (40), wherein the fluoropolymer is powder of polytetrafluoroethylene.

(42) The friction material composition as set forth in any one of the items (37) to (41), wherein the amount of the fluoropolymer is within the range of 0.3 to 6 wt % relative to the amount of the friction material composition.

(43) A friction material obtained by molding the friction material composition as set forth in any one of the items (1) to (42).

(44) A friction member formed by integrating the friction material obtained by molding the friction material composition as set forth in any one of the items (1) to (42), and a back metal.

Effect of the Invention

There can be provided a friction material composition which is less destructive to facing materials compared to conventional products, which has a high friction coefficient upon braking when used in repeated braking during high-speed traveling in the case that the friction material compositions is formed into a brake pad for passenger cars, and which is capable of suppressing pad wear and uneven pad wear; and a friction material and a friction member using this friction material composition.

The disclosure of the present application is related to the subject matters described in Japanese Patent Application No. 2009-131993 filed on Jun. 1, 2009, Japanese patent Application No. 2009-131996 filed on Jun. 1, 2009, and Japanese Patent Application No. 2009-131999 filed on Jun. 1, 2009, the disclosures of which are incorporated herein by reference.

BEST MODES FOR CARRYING OUT THE INVENTION

Hereinafter, the friction material composition of the present invention, a friction material and a friction member using this friction material composition will be described in detail.

The friction material composition of the present invention is a friction material composition comprising: a binder; a fibrous base material; an abrasive material; an inorganic filler; and an organic filler; and is characterized in that the friction material composition comprises at least any one of zinc, a cellulose fiber as a fibrous base material and a flame retardant fiber as a fibrous base material, and 2 to 10 wt % of an iron-based fiber as the fibrous base material, and the amount of an inorganic abrasive material having a Mohs hardness of 8 or higher and a particle size of 1 μm or larger as the abrasive material is within the range of 1 wt % or more.

When the friction material composition has a constitution as described above, the amount of an abrasive material that is highly abrasive is small and the amount of an iron-based fiber that causes adhesive friction with the rotor surface is small. Therefore, the friction material composition exhibits less rotor wear, and fast fading characteristics excellent in the combination of the zinc and a specific amount of the iron-based fiber, in the combination of the cellulose fiber and a specific amount of the iron-based fiber, and/or in the combination of the flame retardant fiber and a specific amount of the iron-based fiber.

The "inorganic abrasive material having a Mohs hardness of 8 or higher" as used herein refers to an inorganic abrasive made of α-alumina, silicon carbide, boron carbide, titanium nitride, titanium carbide, boron carbide, silicon nitride or the like. Furthermore, the particle size of such an abrasive is 1 μm or larger. The particle size is defined as D50 (medium diameter) obtained by a laser diffraction particle size distribution analysis.

The amount of the inorganic abrasive material having a Mohs hardness of 8 or higher and a particle size of 1 μm or larger is preferably 1 wt % or less. When the amount is 1 wt % or less, adverse effects are not easily exerted on the rotor wear and brake squeal characteristics.

The "iron-based fiber" as used herein refers to an iron-based alloy fiber such as a steel fiber or a stainless steel fiber, but from the viewpoint of rotor wear, a steel fiber is preferred. Furthermore, when an iron-based alloy fiber such as a stainless steel fiber is used, it is preferable that the total amount of the steel fiber and the iron-based alloy fiber be within the range of 2 to 10 wt % and the amount of the iron-based alloy fiber be 1 wt % or less from the viewpoint of rotor wear. Furthermore, it is more preferable to comprise the iron-based fiber in an amount of 2 to 8 wt % from the viewpoint of rotor wear.

When zinc is comprised, the friction coefficient during fast fading is improved. The amount of addition of zinc is preferably within the range of 2 to 5 wt %. When the amount of addition of zinc is 2 wt % or more, it is easy to obtain fast fading characteristics. When the amount of addition is 5 wt % or less, pad wear can be prevented from increasing. Furthermore, there are no particular limitations on the shape of zinc, but it is preferable that the zinc be in a powder form.

It is preferable to comprise an aramid fiber as the fibrous base material in an amount of 1.5 wt % or more. When the amount of addition of the aramid fiber is 1.5 wt % or more, the effect of fast fading characteristics can be easily obtained. Furthermore, it is preferable that the aramid fiber has a fibrillar (ramified) shape.

When the friction material composition comprises a flame retardant fiber as the fibrous base material, the friction coefficient during fast fading is further enhanced. The flame retardant fiber as used herein is a precursor fiber of a PAN (polyacrylonitrile) carbon fiber, and is a fiber obtainable by heat treating PAN fiber at the temperature within the range of 200° C. to 350° C. in the atmosphere.

The amount of addition of the flame retardant fiber is preferably within the range of 1 to 10 wt %. When the amount of addition of the flame retardant fiber is 1 wt % or more, an effect of improving the fast fading characteristics is obtained. When the amount of addition is 10 wt % or less, the friction coefficient at the ordinary use is not easily decreased. The flame retardant fiber is such that, from the viewpoint of dispersibility and the effect of reinforcement, the average fiber length is preferably within the range of 1 to 10 mm, and the average fiber diameter is preferably within the range of 10 to 15 μm.

When a cellulose fiber is comprised as the fibrous base material, the friction coefficient during fast fading is further enhanced. The amount of the cellulose fiber is preferably within the range of 1 to 10 wt %. When the amount of the cellulose fiber is 1 wt % or more, the effect of improving the fast fading characteristics can be easily obtained. When the amount is 10 wt % or less, a decrease in the friction coefficient during conventional use can be avoided.

As the binder comprised in the friction material composition for the present invention, a thermosetting resin that is conventionally used in friction materials can be used. Examples of the thermosetting resin include a phenolic resin, and various modified phenolic resins such as an acryl-modified phenolic resin, a silicone-modified phenolic resin, a cashew-modified phenolic resin, an epoxy-modified phenolic resin, and an alkylbenzene-modified phenolic resin. Particularly, a phenolic resin, an acrylic-modified phenolic resin, and a silicone-modified phenolic resin are preferred, and these can be used singly or in combination of two or more kinds.

Furthermore, the binder is preferably comprised in an amount of 5 to 20 wt %, and more preferably comprised in an amount of 5 to 10 wt %, of the total amount of the composition. When the amount of the binder is in this range, a decrease in the strength of the friction material can be avoided, and deterioration of the sound vibration performance such as break squeal due to increased elastic modulus, which is caused by decreasing porosity of the friction material, can be avoided.

Examples of the other fibrous base materials (other than iron-based fiber, aramid fiber, flame retardant fiber, and cellulose fiber) used in the present invention include metal fibers, inorganic fibers, organic fibers, and carbon-based fibers.

As the metal fibers, copper fiber, brass fiber, bronze fiber, titanium fiber, aluminum fiber and the like can be used as the metal fibers other than the iron-based fiber described above, and these fibers can be used singly or in combination of two or more kinds.

Examples of the inorganic fiber that can be used include ceramic fibers, biodegradable ceramic fibers, mineral fibers, glass fibers, potassium titanate fiber, silicate fibers, and wollastonite fiber, and these can be used singly or in combination of two or more kinds. From the viewpoint of reducing environmental materials, it is preferable not to comprise respirable potassium titanate fiber or respirable ceramic fibers.

As the organic fibers, acrylic fibers, phenolic resin fibers and the like can be used as the organic fibers other than the aramid fiber and the cellulose fiber described above, and these fibers can be used singly or in combination of two or more kinds.

Examples of the carbon-based fibers that can be used include a PAN carbon fiber obtained by further carbonizing the flame retardant fiber described above, a pitch carbon fiber, a PAN carbon fiber, and an activated carbon fiber. These fibers can be used singly or in combination of two or more kinds.

All fibrous base materials such as the iron-based fiber and the aramid fiber are preferably comprised in an amount of 5 to 40 wt %, and more preferably comprised in an amount of 10 to 30 wt %, relative to the total amount of the composition. When the amount is in this range, an optimal porosity for friction materials can be obtained, and break squeal can be prevented. Also, an appropriate material strength can be obtained, and satisfactory moldability can be obtained.

In regard to the abrasive material used in the present invention, abrasive materials other than the abrasive material having a Mohs hardness of 8 or higher as described above can be used. Examples of the abrasive materials other than the abrasive material having a Mohs hardness of 8 or higher include zirconium silicate, zirconium oxide, mullite, chromite, titanium oxide, magnesium oxide, silica, iron oxide, and activated alumina such as γ-alumina, and these can be used singly or in combination of two or more kinds. Particularly, when γ-alumina is used, the fading phenomenon occurring at high temperature can be suppressed.

In regard to the specific surface area of the activated alumina, it is considered that the value calculated by a BET method is 150 $m^2/g$ or more, preferably 180 $m^2/g$ or more, and more preferably within the range of 200 to 300 $m^2/g$. When the specific surface area is 150 $m^2/g$ or more, there is a tendency that the effectiveness under such conditions as a high temperature is less decreased. The measurement of the specific surface area can be carried out by, for example, a BET method based on nitrogen gas adsorption.

γ-alumina can be obtained by, for example, drying aluminum hydroxide at a low temperature to obtain alumina gel, and subjecting this alumina gel to calcination (activation treatment) at a temperature of 500° C. to 800° C. Furthermore, commercially available products can also be used, and examples thereof include the activated alumina manufactured by Mizusawa Industrial Chemicals, Ltd. (trade name: Neobead, specific surface area: 230 $m^2/g$).

Furthermore, the amount of the abrasive material (abrasive material other than the abrasive material having a Mohs hardness of 8 or higher) is preferably within the range of 10 to 40 wt %, and more preferably within the range of 15 to 35 wt % relative to the amount of the friction material composition. When the amount is in this range, a braking effect is obtained, and the wear resistance and break squeal characteristics can be ameliorated.

Furthermore, the content of γ-alumina is preferably within the range of 1 to 10 wt % relative to the amount of the friction material composition.

As the inorganic filler used in the present invention, for example, antimony trisulfide, tin sulfide, molybdenum disulfide, iron sulfide, bismuth sulfide, zinc sulfide, calcium hydroxide, calcium oxide, sodium carbonate, calcium carbonate, magnesium carbonate, barium sulfate, dolomite, cokes, graphite, mica, iron oxide, vermiculite, granular potassium titanate, calcium sulfate, plate-like potassium titanate, talc, clay, and zeolite can be used, and these can be used singly or in combination of two or more kinds.

The amount of the inorganic filler is preferably within the range of 10 to 40 wt %, and more preferably within the range of 15 to 35 wt % relative to the amount of the friction material composition. When the amount is in this range, deterioration of heat resistance can be avoided, and it is preferable also from the viewpoint of the balance in the amounts of the other components of the friction material.

Examples of the organic filler comprised in the friction material composition of the present invention include cashew dust, tire rubber powder, acrylic rubber powder, isoprene rubber, NBR powder and SBR powder, and these are used singly or in combination of two or more kinds. Furthermore, the amount of the organic filler is preferably within the range of 1 to 20 wt %, and more preferably within the range of 1 to 10 wt % relative to amount of the friction material composition. When the amount is in this range, an increase in the elastic modulus of the friction material and deterioration of the sound vibration performance such as break squeal can be avoided. Also, deterioration of heat resistance and a decrease in the strength due to the thermal history can be avoided.

In the case of using cashew dust as the organic filler, it is preferable to coat the cashew dust with a liquid rubber in advance, because the occurrence of segregation of cashew dust is suppressed. The amount of the liquid rubber is preferably within the range of 3 to 17 wt % relative to the amount of the cashew dust. When the amount of the liquid rubber is 3 wt % or more, the cashew dust does not easily drop out, and the effect of adhesive force can be obtained. On the other hand, when the amount of the liquid rubber is 17 wt % or less, the friction material composition is not easily subjected to the adverse effects of the aggregation of cashew dust because of the adhesive force of the liquid rubber, and the cashew dust is easily dispersed, so that the occurrence of segregation can be suppressed.

The amount of the coated cashew dust is preferably within the range of 1 to 10 wt % relative to the amount of the friction material composition, from the viewpoint of preventing the occurrence of break squeal and preventing the occurrence of cracks.

As the liquid rubber, it is preferable to use NBR, SBR, IR, acrylic rubber, natural rubber, chloroprene rubber and the like, and the viscosity of the liquid rubber is such that the melt viscosity at 20° C. is preferably within the range of 10,000 to 100,000 cps, more preferably within the range of 30,000 to 80,000 cps, and even more preferably within the range of 40,000 to 60,000 cps. When the viscosity is in the range described above, it is preferable because coating is sufficiently achieved, and the cashew dust is not easily aggregated.

There are no particular limitations on the method of coating the cashew dust with a liquid rubber, but a method of kneading under pressure by using a pressure kneader is preferred.

The friction material composition of the present invention can be used as a friction material such as disc brake pads, brake lining and the like for automobiles, or as a friction material for clutch facings, electromagnetic brakes, retaining brakes and the like, by subjecting the friction material composition of the present invention to processes such as molding, processing and bonding to obtain desired shapes.

Furthermore, in the friction material composition of the present invention, other materials can be incorporated as necessary, in addition to the materials described above, and for example, metal powders such as copper powder, brass powder and bronze powder; or organic additives such as fluoropolymers, for example PTFE (polytetrafluoroethylene), can be incorporated.

Particularly, when PTFE is used, the fading phenomenon at high temperature can be suppressed. The amount of PTFE is preferably within the range of 0.3 to 6 wt %, more preferably within the range of 1 to 5 wt %, and even more preferably within the range of 1 to 3 wt %, relative to the amount of the friction material composition.

The fluoropolymers are preferably used in the form of powder, but even if the fluoropolymers are used in the form of emulsion and are incorporated into the friction material composition by wet mixing, equivalent effects can be expected.

The friction material composition of the present invention can be used per se as a friction material that constitutes a frictional surface, to obtain a friction member. Examples of the friction member using the friction material composition include the following configurations.

(1) A configuration of a friction material only.

(2) A configuration having: a back metal; and a friction material formed on this back metal, the friction material being formed from the friction material composition of the present invention to constitute a frictional surface.

(3) A configuration of further including: a primer layer; and an adhesive layer between the back metal and the friction material in the configuration of the item (2), the primer layer intended for surface modification to increase the adhesive effect of the back metal, and the adhesive layer intended for adhesion of the back metal and the friction material.

Furthermore, the friction material of the present invention can be produced by using a method that is generally used, and the friction material is produced by molding the friction material composition of the present invention, preferably by molding under heat and pressure. More particularly, the friction material composition of the present invention is uniformly mixed using a mixing machine such as a Lodige mixer, a pressurizing kneader or an Eirich mixer, and this mixture is preliminarily molded with a molding mold. The preliminary molding product thus obtained is molded for 2 to 10 minutes under the conditions of a molding temperature of 130° C. to 160° C., and a molding pressure of 20 to 50 MPa, and the molded product thus obtained is heat treated for 2 to 10 hours at 150° C. to 250° C.

Also, the molded product is subjected to painting, a scorch treatment, and a polishing treatment as necessary.

Since the friction material composition of the present invention has a high reinforcing effect, the friction material composition can also be used by molding the composition as an underlayer material for friction members. The "underlayer material" is a layer which is interposed between a friction material constituting the frictional surfaces of a friction member and a back metal, and is intended for an enhancement of shear strength between the friction material and the back metal.

EXAMPLES

The friction material composition of the present invention will be described more specifically by way of Examples.
(Production of Disc Brake Pad)

Materials were mixed according to the mixing ratios indicated in Table 1 to Table 5, and the friction material compositions of Examples 1 to 20 and Comparative Examples 1 to 4 were obtained.

The method of coating cashew dust with IR rubber is as follows. First, 100 parts by mass of cashew dust and 10 parts by mass of liquid IR rubber were subjected to pressure kneading for 3 minutes under a pressure of 0.49 MPa, using a pressurizing kneader (manufactured by Moriyama Manufacturing Co., Ltd.).

This friction material composition was mixed with a Lodige mixer (manufactured by Matsubo Corp., trade name: Lodige Mixer M20), and this mixture was preliminarily molded with a molding press (manufactured by Oji Kikai Kogyo Co., Ltd.). The preliminary molded product thus obtained was molded under heat and pressure for 5 minutes under the conditions of a molding temperature of 145° C. and a molding pressure 30 MPa using a molding press (manufactured by Sanki Seiko Co., Ltd.), and the molded product thus obtained was heat treated for 4.5 hours at 200° C., polished using a rotary polishing machine, and subjected to a scorching treatment at 500° C. Thus, disc brake pads of Examples 1 to 20 and Comparative Examples 1 to 4 were obtained.

In the Examples and Comparative Examples, disc brake pads each having a friction material projection area of 52 cm$^2$ were produced.

(Evaluation of Dropout of Cashew Dust)

Evaluation was carried out by placing the friction material compositions of Examples 1 to 20 and Comparative Examples 1 to 4 obtained by the method described above each separately in a bag made of polyethylene, swinging each of the friction material compositions 10 times, and measuring the mass of cashew dust that had dropped out in the bottom of the bag. The evaluation criteria are as follows.

A: The amount of dropout relative to the amount of incorporation of cashew dust is 1 wt % or less.
B: The amount of dropout relative to the amount of incorporation of cashew dust is 3 wt % or more.

(Evaluation of Heat Fading Characteristics)

An evaluation of the heat fading characteristics was carried out using the disc brake pads of Examples 1 to 20 and Comparative Examples 1 to 4 produced by the method described above and using a brake dynamo tester. In this experiment, an evaluation of the inertia moment of Skyline V35 manufactured by Nissan Motor Co., Ltd. was carried out using a Colette type caliper of general pin-slide type and a ventilated disc rotor (FC190) manufactured by Kiriu Corp.

An effectiveness test was carried out according to SAE J2522, and the smallest value among the friction coefficients occurring in the Fade-1 Section during a set of 15 times in total of braking was evaluated.

(Evaluation of Fast Fading Characteristics)

An evaluation of fast fading characteristics was carried out using the disc brake pads of Examples 1 to 20 and Comparative Examples 1 to 4 produced by the method described above by using a brake dynamo tester. In this experiment, an evaluation of the inertia moment of Skyline V35 manufactured by Nissan Motor Co., Ltd. was carried out using a Colette type caliper of general pin-slide type and a ventilated disc rotor (FC190) manufactured by Kiriu Corp.

An examination according to JASO C427 (initial velocity 50 km/h, final velocity 0 km/h, deceleration 0.3 G, brake temperature prior to braking 100° C., 200 times of braking) was carried out, and then a fast fading test (15 times of braking was carried out at an interval of 60 seconds under the following conditions: initial velocity 200 km/h, final velocity 0 km/h, deceleration 0.8 G, brake temperature prior to $1^{st}$ braking 100° C.). Thus, the minimum value of friction coefficient in the fast fading test, the amount of pad wear, and the amount of uneven pad wear in the sliding direction were measured.

(Evaluation of Rotor Wear)

A test portion having a size of 25 mm×25 mm×8 mm was cut out from the friction material surface of each of the disc brake pads produced with the friction compositions of Examples 1 to 20 and Comparative Examples 1 to 4, and this test portion was pressed under a pressure of 73.5 kPa against a disc rotor rotating at a circumferential velocity equivalent to 130 km/h and was sustained in this state for 22 hours. Subsequently, the amount of rotor wear was measured. A ventilated disc rotor (FC190) manufactured by Kiriu Corp. was used as the disc rotor.

The results are presented in Tables 1 to 5.

TABLE 1

| Components incorporated | | | Example 1 | Example 2 | Example 3 | Example 4 | Example 5 | Example 6 |
|---|---|---|---|---|---|---|---|---|
| | Binder | Phenolic resin (HP491UP manufactured by Hitachi Chemical Co., Ltd.) | 7 | 7 | 7 | 7 | 7 | 7 |
| | Fibrous base material | Aramid fiber (1F538 manufactured by Du Pont-Toray Co., Ltd.) | 2 | 2 | 2 | 2 | 2 | 2 |
| | | Copper fiber | 15 | 15 | 15 | 15 | 15 | 15 |
| | | Mineral fiber (RB240 manufactured by LAPINUS FIRERS B.V.) | 1 | 1 | 1 | 1 | 1 | — |
| | Abrasive material | Zirconium oxide | 27 | 27 | 27 | 27 | 27 | 34 |
| | | γ-alumina manufactured by Mizusawa Industrial Chemicals, Ltd. | — | — | — | — | — | — |
| | | α-alumina: Mohs hardness 8 to 9 (A-31 manufactured by Showa Denko K.K.) | — | — | — | — | — | — |
| | | Zircon sand | — | — | — | — | — | — |
| | Inorganic filler | Potassium titanate | 11 | 10 | 9 | 11 | 11 | 5 |
| | | Barium sulfate (Barium sulfate manufactured by Sakai Chemical Industry Co., Ltd.) | 9 | 8 | 6 | 5 | 6 | 3 |
| | | Mica | 3 | 3 | 3 | 3 | 3 | 3 |
| | | Graphite | 3 | 3 | 3 | 3 | 3 | 3 |
| | | Cokes | 4 | 4 | 4 | 4 | 4 | 4 |
| | | Tin sulfide | 4 | 4 | 4 | 4 | 4 | 4 |
| | | Calcium hydroxide | 3 | 3 | 3 | 3 | 3 | 3 |
| | | Vermiculite | — | — | — | — | — | — |
| | | Molybdenum sulfide | — | — | — | — | — | — |
| | Organic filler | Cashew dust (uncoated) | 3 | 3 | 3 | 3 | 3 | 3 |
| | | Cashew dust (coated) | — | — | — | — | — | — |
| | Steel fiber (#0 manufactured by Global Material Technologies, Inc.) | | 5 | 5 | 5 | 5 | 5 | 5 |
| | Zinc (AN200 manufactured by Toho Zinc Co., Ltd.) | | 3 | 5 | 8 | 3 | 3 | 3 |
| | Flame retardant fiber (Pyromex manufactured by Toho Tenax Co., Ltd.) | | — | — | — | 4 | — | 3 |
| | Cellulose fiber (Neofiber manufactured by Oji Seishi Co., Ltd.) | | — | — | — | — | 3 | 3 |
| | PTFE powder manufactured by Sumitomo 3M, Ltd. | | — | — | — | — | — | — |

TABLE 1-continued

|  |  | Example 1 | Example 2 | Example 3 | Example 4 | Example 5 | Example 6 |
|---|---|---|---|---|---|---|---|
| IR rubber coating of cashew dust |  | None | None | None | None | None | None |
| Dropout of cashew dust |  | B | B | B | B | B | B |
| Heat fading characteristics | Minimum value of friction coefficient | 0.20 | 0.19 | 0.18 | 0.19 | 0.19 | 0.19 |
| Fast fading characteristics | Minimum value of friction coefficient | 0.19 | 0.19 | 0.19 | 0.22 | 0.21 | 0.23 |
|  | Amount of pad wear (mm) | 2.21 | 2.80 | 3.10 | 1.76 | 2.28 | 1.76 |
|  | Amount of uneven pad wear in sliding direction (mm) | 0.31 | 0.35 | 0.50 | 0.30 | 0.59 | 0.17 |
|  | Rotor wear (μm) | 1.7 | 1.7 | 1.8 | 2.0 | 1.7 | 1.7 |

TABLE 2

|  |  |  | Example 7 | Example 8 | Example 9 | Example 10 |
|---|---|---|---|---|---|---|
| Components incorporated | Binder | Phenolic resin (HP491UP manufactured by Hitachi Chemical Co., Ltd.) | 7 | 7 | 7 | 7 |
|  | Fibrous base material | Aramid fiber (1F538 manufactured by Du Pont-Toray Co., Ltd.) | 2 | 2 | 2 | 2 |
|  |  | Copper fiber | 15 | 15 | 15 | 15 |
|  |  | Mineral fiber (RB240 manufactured by LAPINUS FIRERS B.V.) | 1 | 1 | 1 | 1 |
|  | Abrasive material | Zirconium oxide | 27 | 25 | 25 | 25 |
|  |  | γ-alumina manufactured by Mizusawa Industrial Chemicals, Ltd. | — | 2 | 2 | 2 |
|  |  | α-alumina: Mohs hardness 8 to 9 (A-31 manufactured by Showa Denko K.K.) | — | — | — | — |
|  |  | Zircon sand | — | — | — | — |
|  | Inorganic filler | Potassium titanate | 11 | 11 | 10 | 9 |
|  |  | Barium sulfate (Barium sulfate manufactured by Sakai Chemical Industry Co., Ltd.) | 9 | 8 | 7 | 5 |
|  |  | Mica | 3 | 3 | 3 | 3 |
|  |  | Graphite | 3 | 3 | 3 | 3 |
|  |  | Cokes | 4 | 4 | 4 | 4 |
|  |  | Tin sulfide | 4 | 4 | 4 | 4 |
|  |  | Calcium hydroxide | 3 | 3 | 3 | 3 |
|  |  | Vermiculite | — | — | — | — |
|  |  | Molybdenum sulfide | — | — | — | — |
|  | Organic filler | Cashew dust (uncoated) | — | — | — | — |
|  |  | Cashew dust (coated) | 3 | 3 | 3 | 3 |
|  | Steel fiber (#0 manufactured by Global Material Technologies, Inc.) |  | 5 | 5 | 5 | 5 |
|  | Zinc (AN200 manufactured by Toho Zinc Co., Ltd.) |  | 3 | 3 | 5 | 8 |
|  | Flame retardant fiber (Pyromex manufactured by Toho Tenax Co., Ltd.) |  | — | — | — | — |
|  | Cellulose fiber (Neofiber manufactured by Oji Seishi Co., Ltd.) |  | — | — | — | — |
|  | PTFE powder manufactured by Sumitomo 3M, Ltd. |  | — | 1 | 1 | 1 |
| IR rubber coating of cashew dust |  |  | coated | coated | coated | coated |
| Dropout of cashew dust |  |  | A | A | A | A |
| Heat fading characteristics | Minimum value of friction coefficient |  | 0.20 | 0.29 | 0.28 | 0.30 |
| Fast fading characteristics | Minimum value of friction coefficient |  | 0.19 | 0.19 | 0.19 | 0.20 |
|  | Amount of pad wear (mm) |  | 2.30 | 2.30 | 2.55 | 3.15 |
|  | Amount of uneven pad wear in sliding direction (mm) |  | 0.35 | 0.33 | 0.35 | 0.40 |
|  | Rotor wear (μm) |  | 1.7 | 1.8 | 1.9 | 1.8 |

TABLE 3

|  |  |  | Example 11 | Example 12 | Example 13 | Example 14 | Example 15 |
|---|---|---|---|---|---|---|---|
| Components incorporated | Binder | Phenolic resin (HP491UP manufactured by Hitachi Chemical Co., Ltd.) | 7 | 7 | 7 | 7 | 7 |

TABLE 3-continued

|  |  |  | Example 11 | Example 12 | Example 13 | Example 14 | Example 15 |
|---|---|---|---|---|---|---|---|
|  | Fibrous base material | Aramid fiber (1F538 manufactured by Du Pont-Toray Co., Ltd.) | 2 | 2 | 2 | 2 | 2 |
|  |  | Copper fiber | 15 | 15 | 15 | 15 | 15 |
|  |  | Mineral fiber (RB240 manufactured by LAPINUS FIRERS B.V.) | 1 | 1 | 1 | 1 | 1 |
|  | Abrasive material | Zirconium oxide | 27 | 27 | 27 | 25 | 25 |
|  |  | γ-alumina manufactured by Mizusawa Industrial Chemicals, Ltd. | — | — | — | 2 | 2 |
|  |  | α-alumina: Mohs hardness 8 to 9 (A-31 manufactured by Showa Denko K.K.) | — | — | — | — | — |
|  |  | Zircon sand | — | — | — | — | — |
|  | Inorganic filler | Potassium titanate | 12 | 11 | 12 | 12 | 11 |
|  |  | Barium sulfate (Barium sulfate manufactured by Sakai Chemical Industry Co., Ltd.) | 7 | 6 | 7 | 6 | 5 |
|  |  | Mica | 3 | 3 | 3 | 3 | 3 |
|  |  | Graphite | 3 | 3 | 3 | 3 | 3 |
|  |  | Cokes | 4 | 4 | 4 | 4 | 4 |
|  |  | Tin sulfide | 4 | 4 | 4 | 4 | 4 |
|  |  | Calcium hydroxide | 3 | 3 | 3 | 3 | 3 |
|  |  | Vermiculite | — | — | — | — | — |
|  |  | Molybdenum sulfide | — | — | — | — | — |
|  | Organic filler | Cashew dust (uncoated) | 3 | 3 | — | — | — |
|  |  | Cashew dust (coated) | — | — | 3 | 3 | 3 |
|  | Steel fiber (#0 manufactured by Global Material Technologies, Inc.) |  | 5 | 5 | 5 | 5 | 5 |
|  | Zinc (AN200 manufactured by Toho Zinc Co., Ltd.) |  | — | 3 | — | — | 3 |
|  | Flame retardant fiber (Pyromex manufactured by Toho Tenax Co., Ltd.) |  | — | — | — | — | — |
|  | Cellulose fiber (Neofiber manufactured by Oji Seishi Co., Ltd.) |  | 4 | 3 | 4 | 4 | 3 |
|  | PTFE powder manufactured by Sunitomo 3M, Ltd. |  | — | — | — | 1 | 1 |
| IR rubber coating of cashew dust |  |  | None | None | Coated | Coated | Coated |
| Dropout of cashew dust |  |  | B | B | A | A | A |
| Heat fading characteristics | Minimum value of friction coefficient |  | 0.20 | 0.20 | 0.20 | 0.30 | 0.29 |
| Fast fading characteristics | Minimum value of friction coefficient |  | 0.20 | 0.21 | 0.20 | 0.20 | 0.21 |
|  | Amount of pad wear (mm) |  | 2.55 | 1.85 | 2.50 | 2.32 | 2.00 |
|  | Amount of uneven pad wear in sliding direction (mm) |  | 0.44 | 0.33 | 0.38 | 0.33 | 0.30 |
|  | Rotor wear (μm) |  | 2.0 | 2.0 | 1.9 | 1.8 | 1.9 |

TABLE 4

|  |  |  | Example 16 | Example 17 | Example 18 | Example 19 | Example 20 |
|---|---|---|---|---|---|---|---|
| Components incorporated | Binder | Phenolic resin (HP491UP manufactured by Hitachi Chemical Co., Ltd.) | 7 | 7 | 7 | 7 | 7 |
|  | Fibrous base material | Aramid fiber (1F538 manufactured by Du Pont-Toray Co., Ltd.) | 2 | 2 | 2 | 2 | 2 |
|  |  | Copper fiber | 15 | 15 | 15 | 15 | 15 |
|  |  | Mineral fiber (RB240 manufactured by LAPINUS FIRERS B.V.) | 1 | 1 | 1 | 1 | 1 |
|  | Abrasive material | Zirconium oxide | 27 | 27 | 27 | 25 | 25 |
|  |  | γ-alumina manufactured by Mizusawa Industrial Chemicals, Ltd. | — | — | — | 2 | 2 |
|  |  | α-alumina: Mohs hardness 8 to 9 (A-31 manufactured by Showa Denko K.K.) | — | — | — | — | — |
|  |  | Zircon sand | — | — | — | — | — |

TABLE 4-continued

|  |  |  | Example 16 | Example 17 | Example 18 | Example 19 | Example 20 |
|---|---|---|---|---|---|---|---|
|  | Inorganic filler | Potassium titanate | 12 | 11 | 12 | 12 | 11 |
|  |  | Barium sulfate (Barium sulfate manufactured by Sakai Chemical Industry Co., Ltd.) | 7 | 6 | 7 | 6 | 5 |
|  |  | Mica | 3 | 3 | 3 | 3 | 3 |
|  |  | Graphite | 3 | 3 | 3 | 3 | 3 |
|  |  | Cokes | 4 | 4 | 4 | 4 | 4 |
|  |  | Tin sulfide | 4 | 4 | 4 | 4 | 4 |
|  |  | Calcium hydroxide | 3 | 3 | 3 | 3 | 3 |
|  |  | Vermiculite | — | — | — | — | — |
|  |  | Molybdenum sulfide | — | — | — | — | — |
|  | Organic filler | Cashew dust (uncoated) | 3 | 3 | — | — | — |
|  |  | Cashew dust (coated) | — | — | 3 | 3 | 3 |
|  | Steel fiber (#0 manufactured by Global Material Technologies, Inc.) |  | 5 | 5 | 5 | 5 | 5 |
|  | Zinc (AN200 manufactured by Toho Zinc Co., Ltd.) |  | — | — | — | — | — |
|  | Flame retardant fiber (Pyromex manufactured by Toho Tenax Co., Ltd.) |  | 4 | 3 | 4 | 4 | 3 |
|  | Cellulose fiber (Neofiber manufactured by Oji Seishi Co., Ltd.) |  | — | 3 | — | — | 3 |
|  | PTFE powder manufactured by Sunitomo 3M, Ltd. |  | — | — | — | 1 | 1 |
| IR rubber coating of cashew dust |  |  | None | None | Coated | Coated | Coated |
| Dropout of cashew dust |  |  | B | B | A | A | A |
| Heat fading characteristics | Minimum value of friction coefficient |  | 0.21 | 0.20 | 0.22 | 0.30 | 0.30 |
| Fast fading characteristics | Minimum value of friction coefficient |  | 0.20 | 0.21 | 0.20 | 0.19 | 0.20 |
|  | Amount of pad wear (mm) |  | 2.80 | 1.85 | 2.66 | 2.50 | 2.51 |
|  | Amount of uneven pad wear in sliding direction (mm) |  | 0.44 | 0.33 | 0.40 | 0.35 | 0.33 |
|  | Rotor wear (μm) |  | 2.0 | 2.0 | 1.8 | 1.8 | 1.8 |

TABLE 5

|  |  |  | Comparative Example 1 | Comparative example 2 | Comparative example 3 | Comparative example 4 |
|---|---|---|---|---|---|---|
| Components incorporated | Binder | Phenolic resin (HP491UP manufactured by Hitachi Chemical Co., Ltd.) | 7 | 7 | 7 | 7 |
|  | Fibrous base material | Aramid fiber (1F538 manufactured by Du Pont-Toray Co., Ltd.) | 2 | 2 | 4 | 1 |
|  |  | Copper fiber | 15 | 15 | 15 | 14 |
|  |  | Mineral fiber (RB240 manufactured by LAPINUS FIRERS B.V.) | 1 | 2 | 2 | — |
|  | Abrasive material | Zirconium oxide | 27 | 32 | 24 | 10 |
|  |  | γ-alumina manufactured by Mizusawa Industrial Chemicals, Ltd. | — | — | — | — |
|  |  | α-alumina: Mohs hardness 8 to 9 (A-31 manufactured by Showa Denko K.K.) | — | — | — | 4 |
|  |  | Zircon sand | — | — | — | 10 |
|  | Inorganic filler | Potassium titanate | 12 | 12 | 15 | — |
|  |  | Barium sulfate (Barium sulfate manufactured by Sakai Chemical Industry Co., Ltd.) | 11 | 11 | 11 | — |
|  |  | Mica | 3 | 4 | 3 | — |
|  |  | Graphite | 3 | 4 | 3 | 2 |
|  |  | Cokes | 4 | 2 | 2 | 13 |
|  |  | Tin sulfide | 4 | 4 | 4 | 7 |
|  |  | Calcium hydroxide | 3 | 2 | 2 | 3 |
|  |  | Vermiculite | — | — | — | 5 |
|  |  | Molybdenum sulfide | — | — | — | 3 |
|  | Organic filler | Cashew dust (uncoated) | 3 | 3 | 5 | 4 |
|  |  | Cashew dust (coated) | — | — | — | — |
|  | Steel fiber (#0 manufactured by Global Material Technologies, Inc.) |  | 5 | — | — | 18 |
|  | Zinc (AN200 manufactured by Toho Zinc Co., Ltd.) |  | — | — | 3 | 1 |

TABLE 5-continued

|  |  | Comparative Example 1 | Comparative example 2 | Comparative example 3 | Comparative example 4 |
|---|---|---|---|---|---|
|  | Flame retardant fiber (Pyromex manufactured by Toho Tenax Co., Ltd.) | — | — | — | — |
|  | Cellulose fiber (Neofiber manufactured by Oji Seishi Co., Ltd.) | — | — | — | — |
|  | PTFE powder manufactured by Sunitomo 3M, Ltd. | — | — | — | — |
| IR rubber coating of cashew dust |  | None | None | None | None |
| Dropout of cashew dust |  | B | B | B | B |
| Heat fading characteristics | Minimum value of friction coefficient | 0.19 | 0.20 | 0.18 | 0.28 |
| Fast fading characteristics | Minimum value of friction coefficient | 0.14 | 0.11 | 0.09 | 0.21 |
|  | Amount of pad wear (mm) | 3.30 | 4.89 | 5.01 | 1.70 |
|  | Amount of uneven pad wear in sliding direction (mm) | 0.88 | 1.15 | 1.44 | 0.36 |
|  | Rotor wear (μm) | 1.8 | 2.2 | 2.6 | 35.5 |

Examples 1 to 20 exhibit fast fading characteristics equivalent to the same characteristics of Comparative Example 4 which is an LS material, and it is clear that the rotor wear is remarkably small. Furthermore, even when compared with Comparative Examples 2 and 3 which are conventional NAO materials, Examples 1 to 20 exhibit markedly high fast fading characteristics, and it is clear that these Examples exhibit equivalent rotor wear.

When Examples 1 to 3 are compared with Comparative Example 1, it is clear that the combination of a small amount of an iron-based fiber and zinc has a conspicuous effect of improving the fast fading characteristics.

When Example 11 is compared with Comparative Example 1, it is clear that the combination of a small amount of an iron-based fiber and a cellulose fiber has a conspicuous effect of improving the fast fading characteristics.

When Example 16 is compared with Comparative Example 1, it is clear that the combination of a small amount of an iron-based fiber and a flame retardant fiber has a conspicuous effect of improving the fast fading characteristics.

According to Examples 7 to 10, 13 to 15 and 18 to 20, it is clear that when cashew dust is coated with a liquid rubber, an effect of suppressing the dropout of cashew dust is obtained.

According to Examples 8 to 10, 14, 15, 19 and 20, it is clear that the combination of γ-alumina and a PTFE powder has an effect of improving the heat fading characteristics.

INDUSTRIAL APPLICABILITY

The friction material of the present invention that is exclusive for brake pads for passenger cars has excellent effects such as described below.

According to the present invention, there are provided a friction material composition which is less destructive to facing materials as compared with conventional products, which has a high friction coefficient upon braking when a method such as used in repeated braking during high-speed traveling, and which is capable of suppressing pad wear and uneven pad wear; and a friction material and a friction member using this friction material composition.

The invention claimed is:

1. A friction material composition comprising:
   a binder;
   a fibrous base material;
   an abrasive material;
   an inorganic filler; and
   an organic filler comprising cashew dust in an amount of 1 to 10 wt % relative to the amount of the friction material composition, wherein the cashew dust is coated with a rubber in an amount of 3 to 17 wt % relative to the amount of the cashew dust,
   wherein the fibrous base material comprises a cellulose fiber and an iron-based fiber, the iron-based fiber present in the friction material composition in an amount of 2 to 10 wt %, and
   wherein the abrasive material comprises an inorganic abrasive material having a Mohs hardness of 8 or higher and a particle diameter of 1 μm or larger in an amount of 1 wt % or less.

2. The friction material composition according to claim 1, comprising the cellulose fiber in an amount of 1 to 10 wt % relative to amount of the friction material composition.

3. The friction material composition according to claim 1, wherein the fibrous base material further comprises an aramid fiber, the aramid fiber present in an amount of 1.5 wt % or more relative to amount of the friction material composition.

4. The friction material composition according to claim 1, further comprising zinc.

5. The friction material composition according to claim 4, wherein the amount of the zinc is within the range of 2 to 5 wt %.

6. The friction material composition according to claim 1, wherein the fibrous base material further comprises a flame retardant fiber.

7. The friction material composition according to claim 6, comprising the flame retardant fiber in an amount of 1 to 10 wt % relative to the amount of the friction material composition.

8. The friction material composition according to claim 1, wherein the abrasive material further comprises activated alumina as an abrasive material, and a fluoropolymer as the organic filler.

9. The friction material composition according to claim 8, wherein the activated alumina is an activated alumina having a specific surface area calculated by a BET method of 150 m$^2$/g or larger.

10. The friction material composition according to claim 8, wherein the activated alumina is γ-alumina.

11. The friction material composition according to claim 8, wherein the amount of the activated alumina is within the range of 1 to 10 wt % relative to the amount of the friction material composition.

12. The friction material composition according to claim 8, wherein the fluoropolymer is a powder of polytetrafluoroethylene.

13. The friction material composition according to claim 8, wherein the amount of the fluoropolymer is within the range of 0.3 to 6 wt % relative to the amount of the friction material composition.

14. A friction material obtained by molding the friction material composition according to claim 1.

15. A friction member formed by integrating the friction material obtained by molding the friction material composition according to claim 14, and a back metal.

* * * * *